US008041507B2

(12) United States Patent
Ieda et al.

(10) Patent No.: US 8,041,507 B2
(45) Date of Patent: Oct. 18, 2011

(54) METER SUPPORT STRUCTURE

(75) Inventors: Katsumasa Ieda, Saitama (JP); Shinji Takahashi, Saitama (JP); Kazuhiro Yasuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1090 days.

(21) Appl. No.: 11/892,483

(22) Filed: Aug. 23, 2007

(65) Prior Publication Data

US 2008/0054138 A1 Mar. 6, 2008

(30) Foreign Application Priority Data

Aug. 31, 2006 (JP) ................................. 2006-236956

(51) Int. Cl.
*G01C 21/00* (2006.01)
(52) U.S. Cl. ......... 701/213; 248/214; 343/711; 224/413
(58) Field of Classification Search .................. 248/214, 248/229.1; 701/213; 343/711; 224/413; 280/288.4; 342/357.06
See application file for complete search history.

(56) References Cited

U.S. PATENT DOCUMENTS

| | | | | |
|---|---|---|---|---|
| 2,168,939 A | * | 8/1939 | Kraeft | 74/551.8 |
| 3,426,614 A | * | 2/1969 | Jameson et al. | 74/502.2 |
| 4,436,350 A | * | 3/1984 | Jolin | 312/7.1 |
| 4,687,072 A | * | 8/1987 | Komuro | 180/219 |
| 5,222,752 A | * | 6/1993 | Hewitt | 280/288.4 |
| 6,305,241 B1 | * | 10/2001 | Masui et al. | 74/551.8 |
| 6,331,089 B1 | * | 12/2001 | Iteya | 403/56 |
| 7,158,884 B2 | * | 1/2007 | Takahashi | 701/213 |
| 7,209,830 B2 | * | 4/2007 | Takahashi | 701/213 |
| 7,473,017 B2 | * | 1/2009 | Yamamoto et al. | 362/473 |
| 2002/0113185 A1 | * | 8/2002 | Ziegler | 248/309.1 |
| 2004/0135722 A1 | * | 7/2004 | Takahashi | 342/357.06 |
| 2007/0247377 A1 | * | 10/2007 | Funayose | 343/711 |
| 2008/0073396 A1 | * | 3/2008 | Chiang et al. | 224/413 |

FOREIGN PATENT DOCUMENTS

JP 2006-126169 A 5/2006

* cited by examiner

*Primary Examiner* — Kimberly Wood
(74) *Attorney, Agent, or Firm* — Birch, Stewart, Kolasch & Birch, LLP

(57) ABSTRACT

A meter support structure for a vehicle includes a leg portion of a meter stay that is joined to a top bracket disposed on an upper end of a steering shaft by way of a mounting portion at a lower end portion of the leg portion. An upper portion of the meter stay is bent rearwardly to form a meter support portion. The meter support portion extends to an area upward of the top bracket and a meter is mounted thereon. The meter is then fitted with a meter cover. A pressure contact portion extends downwardly from a trailing end of the meter support portion. A rubber cushion mounted to the pressure contact portion is pressed up against a receiver member fixed to a side of the top bracket. Support stiffness is thereby enhanced and vibration-proof support is thereby provided.

20 Claims, 13 Drawing Sheets

METER SUPPORT STRUCTURE

CROSS-REFERENCE TO RELATED APPLICATION

The present application claims priority under 35 U.S.C. §119 to Japanese Patent Application No. 2006-236956, filed Aug. 31, 2006, the entire contents of which are hereby incorporated by reference.

BACKGROUND OF THE INVENTION

1. Field of the Invention

The present invention relates to meter support structures disposed in portions near steering mechanisms, suitable for use in various types of vehicles having handlebars, such as offroad vehicles and the like.

2. Description of Background Art

A known meter support structure includes, in an offroad vehicle having a handlebar, a meter support member formed from a pipe member having a first end fixed to a handlebar support member disposed in a steering shaft. Further, the meter support member has a second end bent upwardly of the handlebar support member to form a meter support for supporting a meter thereon, and the meter is made to support a handlebar cover. (See Japanese Patent Laid-open No. 2006-126169.)

The meter support member has the first end fixed to the handlebar support member and the second end supporting the meter. This means that the meter, which weighs heavily, is supported by a cantilever and a fixed point of the meter support member is away from a meter support point thereof. As a result, the meter tends to vibrate. If the meter vibrates while the vehicle is running, it is hard to view the reading and noise tends to occur. This requires a highly rigid support. As a result, the meter support member becomes larger and heavier. There is therefore a need for a meter support structure that can be relatively downsized and lightly in weight. An object of the present invention is to achieve that need.

SUMMARY AND OBJECTS OF THE INVENTION

To achieve the foregoing object, a first aspect of the present invention provides a meter support structure for a vehicle that having a handlebar support member, a handlebar, and a meter. The handlebar support member is disposed on an upper end portion of a steering shaft. The handlebar is fixed to the handlebar support member. The meter is supported by the handlebar support member on a point near the handlebar via a meter support member. In this meter support structure, the meter support member includes a leg portion extending vertically and a meter support portion bent from an upper portion of the leg portion to extend toward an area upward of the handlebar support member. The leg portion has a lower end portion supported on a side of the steering shaft. The meter is disposed upward of the handlebar support member by mounting the meter on the meter support portion. Further, an end portion of the meter support portion disposed upward of the handlebar support member is supported by being pressed up against a receiver portion disposed on the side of the steering shaft.

In accordance with a second aspect of the present invention, in the foregoing first aspect of the present invention, the end portion disposed upward of the handlebar support member is a pressure contact portion included in the meter support portion and an elastic member disposed on the pressure contact portion is pressed against the receiver portion.

In accordance with a third aspect of the present invention, in the foregoing second aspect of the present invention, the pressure contact portion extends downwardly from the meter support portion, the receiver portion is supported by the handlebar support member and includes a receiver flange overlapping longitudinally rearward of the pressure contact portion. Further, the elastic member is pressed up against the receiver flange from a forward direction.

In accordance with a fourth aspect of the present invention, in the foregoing first aspect of the present invention, the leg portion of the meter support member is attached to the handlebar support member from the forward direction and a direction in which the leg portion is attached coincides with a direction in which the elastic member is pressed.

In accordance with a fifth aspect of the present invention, in the foregoing first aspect of the present invention, the meter is made to support a handlebar cover.

Effects of the invention include the following:

In accordance with the first aspect of the present invention, the end portion of the meter support portion disposed upward of the handlebar support member is supported by being pressed up against the receiver portion disposed on the side of the steering shaft. Support stiffness of the meter support member can therefore be enhanced. A need can also be eliminated for building a large and heavy meter support member. As a result, a relatively compact and lightweight meter support structure can be obtained.

In accordance with the second aspect of the present invention, the end portion disposed upward of the handlebar support member is the pressure contact portion included in the meter support portion and the elastic member disposed on the pressure contact portion is pressed against the receiver portion. Vibration-proof support can therefore be provided for a rear portion side of the meter support portion with the elastic member, allowing meter vibration to be absorbed.

In accordance with the third aspect of the present invention, the pressure contact portion extends downwardly from the meter support portion, the receiver portion is supported by the handlebar support member and includes the receiver flange overlapping longitudinally rearward of the pressure contact portion. The receiver portion can therefore be disposed near the pressure contact portion, which allows the receiver member to be even more downsized. In addition, the meter support member vibrates pivotally about a cantilevered fixed portion, causing a rear portion side to vibrate longitudinally. The pressure contact portion is then pressed against the receiver flange from the forward direction. This effectively provides vibration-proof support for the rear portion side.

In accordance with the fourth aspect of the present invention, the leg portion of the meter support member is attached to the handlebar support member from the forward direction and thereby the direction in which the leg portion is attached coincides with the direction in which the elastic member is pressed. Attaching the leg portion of the meter support member, therefore, results in the elastic member being pressed against the receiver flange. This facilitates assembly procedures.

In accordance with the fifth aspect of the present invention, the meter is made to support the handlebar cover. As a result, a support structure for the handlebar cover can be simplified and stiffness of the meter support structure is enhanced. Accordingly, the meter can be arranged to support the handlebar cover which weighs relatively heavily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the description, each of the longitudinal, lateral, and vertical directions is based on the vehicle. Each of these directions with respect to a component or part of the vehicle is based on a corresponding mounting condition in the vehicle body.

Figure 1:
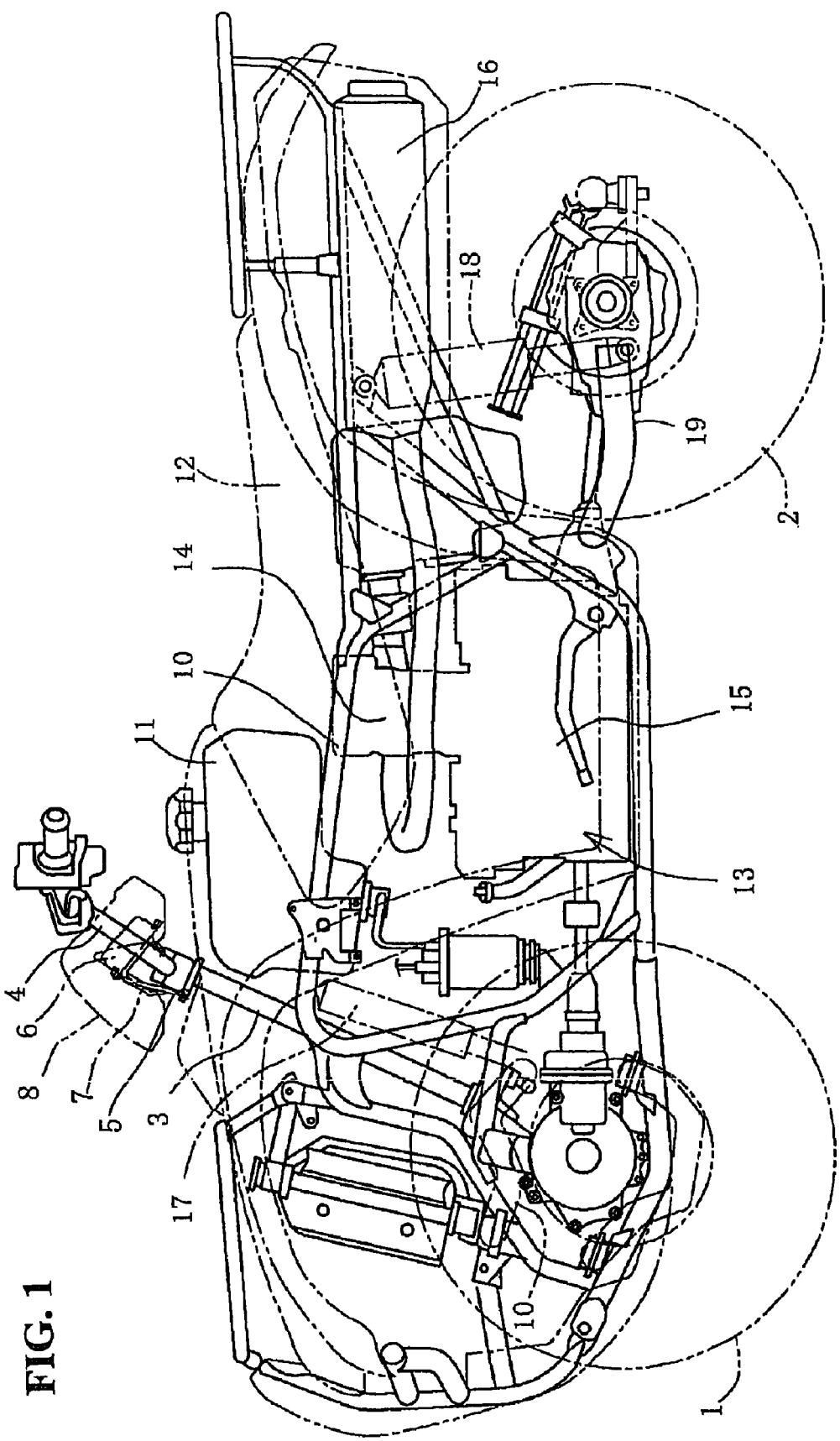
FIG. 1 is a side elevational view showing an offroad vehicle according to an embodiment of the present invention.

FIG. 1 is a side elevational view showing an offroad vehicle according to the embodiment of the present invention. The offroad vehicle is a saddle riding type four-wheel vehicle having low-pressure balloon tires mounted on left and right front wheels 1 and rear wheels 2. The front wheels 1 are steered by a handlebar 4 via a steering shaft 3.

A meter 6 is supported via a meter stay 7 serving as a meter support member upwardly of a top bracket 5 disposed on an upper end of the steering shaft 3 and serving as a handlebar support member. The meter 6 is covered with a meter cover 8. The meter cover 8 is mounted on the meter 6.

FIG. 1 illustrates a vehicle body frame 10; a fuel tank 11; a seat 12; and a power unit 13 that includes a longitudinal four-cycle engine 14 and a transmission 15. Also shown are Further, a muffler 16; a front cushion 17 of a front wheel suspension; a rear cushion 18 of a rear wheel suspension; and a rear swing arm 19 supporting the rear wheels 2 vertically swingably.

The front wheels 1 and the rear wheels 2 form a four-wheel drive system, in which each of the front wheels 1 and the rear wheels 2 is shaft-driven by the power unit 13.

Figure 2:
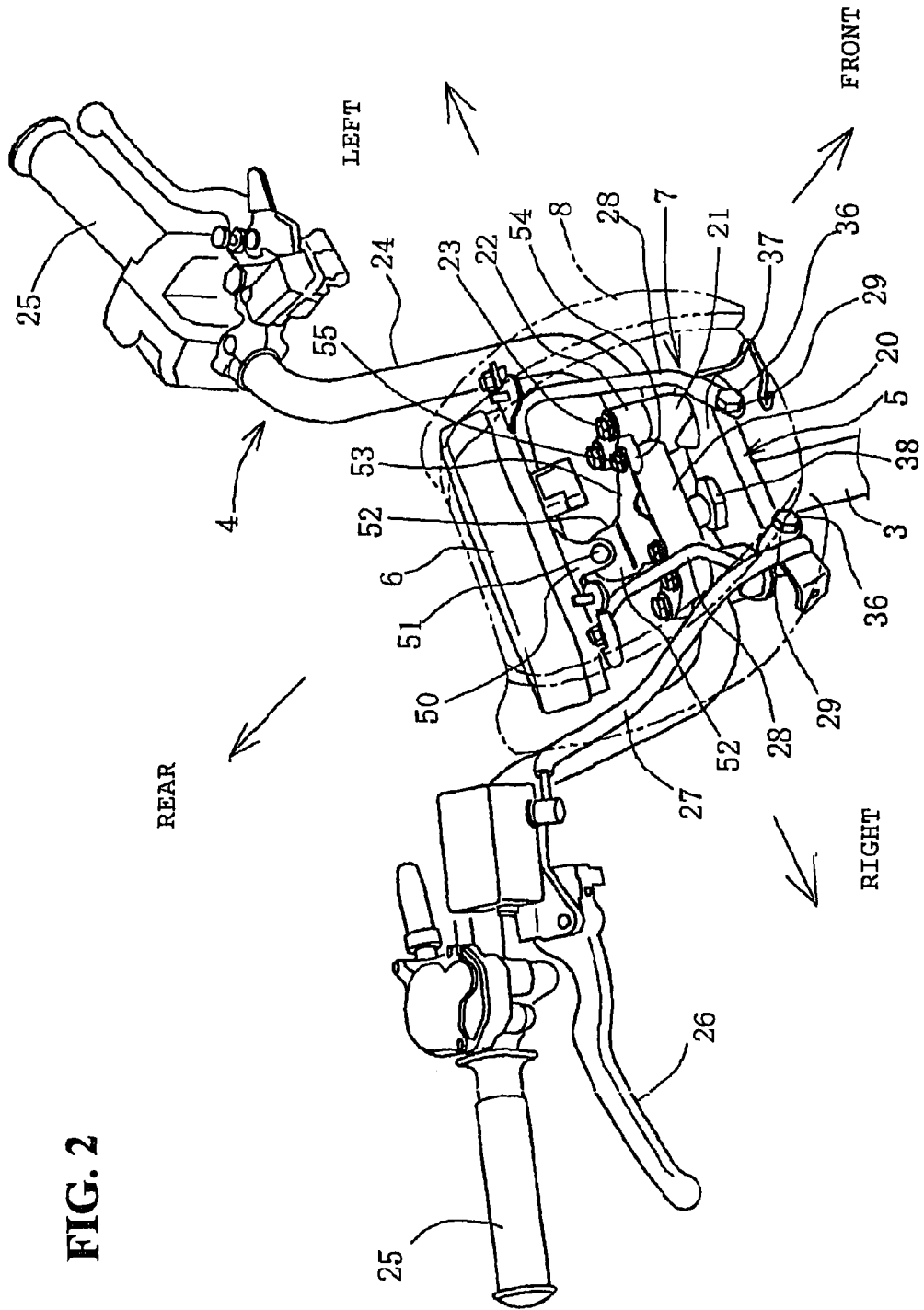
FIG. 2 is a perspective view showing a meter support portion.

FIG. 2 is a perspective view showing the handlebar 4 and the meter 6, as viewed from an obliquely right forward direction of the vehicle body. The handlebar 4 includes a central portion 20 that is lower one step from the other portions thereof. The central portion 20 extends horizontally and is disposed upward of the top bracket 5. The central portion 20 is clamped between a lower bracket 21 and an upper bracket 22 and fixed in position with a bolt 23. The lower bracket 21 and the upper bracket 22 form a fixing member for the handlebar 4.

The handlebar 4 includes risers 24 that are upwardly bent from both ends of the central portion 20. An upper portion of each of the risers 24 is further bent to the left or the right, as applicable. A grip 25 is disposed at a leading end portion of each of the risers 24. A front wheel brake lever 26 is disposed near the grip 25 on the right side. A hydraulic hose 27 extending from a master cylinder, not shown, operated by the front wheel brake lever 26 is extended toward a front brake downward by way of a forward right side of the top bracket 5.

The meter 6 is supported via the meter stay 7 at a position upward of the central portion 20. The meter stay 7 is formed by bending a metal pipe member. The meter stay 7 includes a pair of left and right leg portions 28 that form part of the meter stay 7 and extend vertically. A lower end portion of each of the leg portions 28 is formed into a flat mounting portion 29 which, in turn, is attached to a front side surface of the top bracket 5 with a bolt and a nut (only a nut 36 is shown in FIG. 2). The meter 6 is covered with the meter cover 8 which is mounted to the meter 6 as will be described later.

Figure 3:
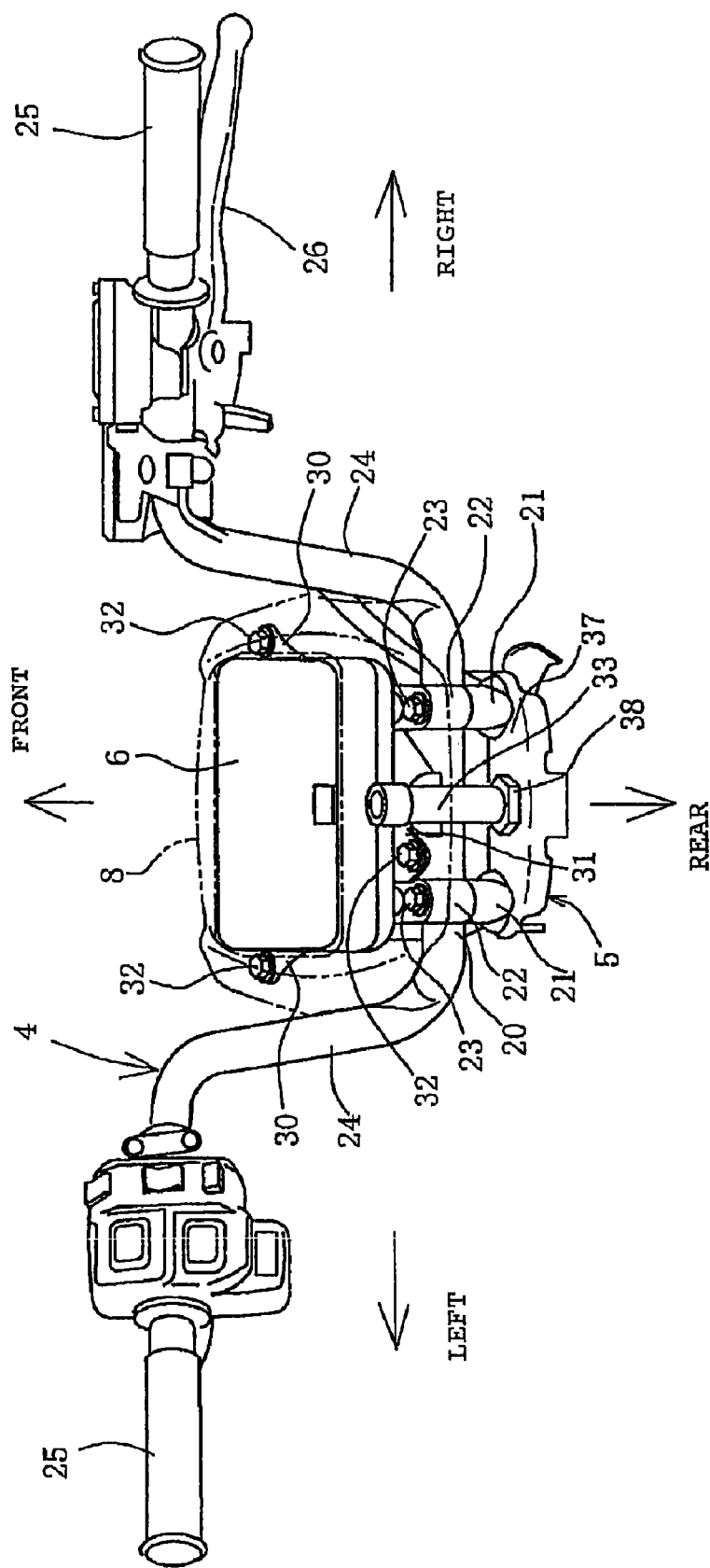
FIG. 3 is a view showing a meter upper portion, as viewed from a rearward direction of a vehicle body.

FIG. 3 is a view showing a portion of the vehicle body including the handlebar 4 and the meter 6, as viewed from a side of a rider situated rearward of a center of the vehicle body. The meter 6 and the meter cover 8 are disposed inside the left and right risers 24 and upward of the central portion 20. Further, the meter 6 includes protrusions 30, 30 protruding to the left and right at a front side of the meter 6 and a protrusion 31 protruding rearwardly from a position on the left side of the meter 6. As such, the meter 6 is mounted to the meter stay 7 (FIG. 2) with a bolt 32 installed in each of these protrusions 30, 30, 31.

A breather pipe 33 extends upwardly from a central portion of the top bracket 5. An upper end of the breather pipe 33 is located rearward and at a lateral center of the meter 6. The lower bracket 21 and the upper bracket 22 are disposed on either end of the top bracket 5. The lower brackets 21 and the upper brackets 22 secure the central portion 20 at a given lateral spacing.

Figure 4:
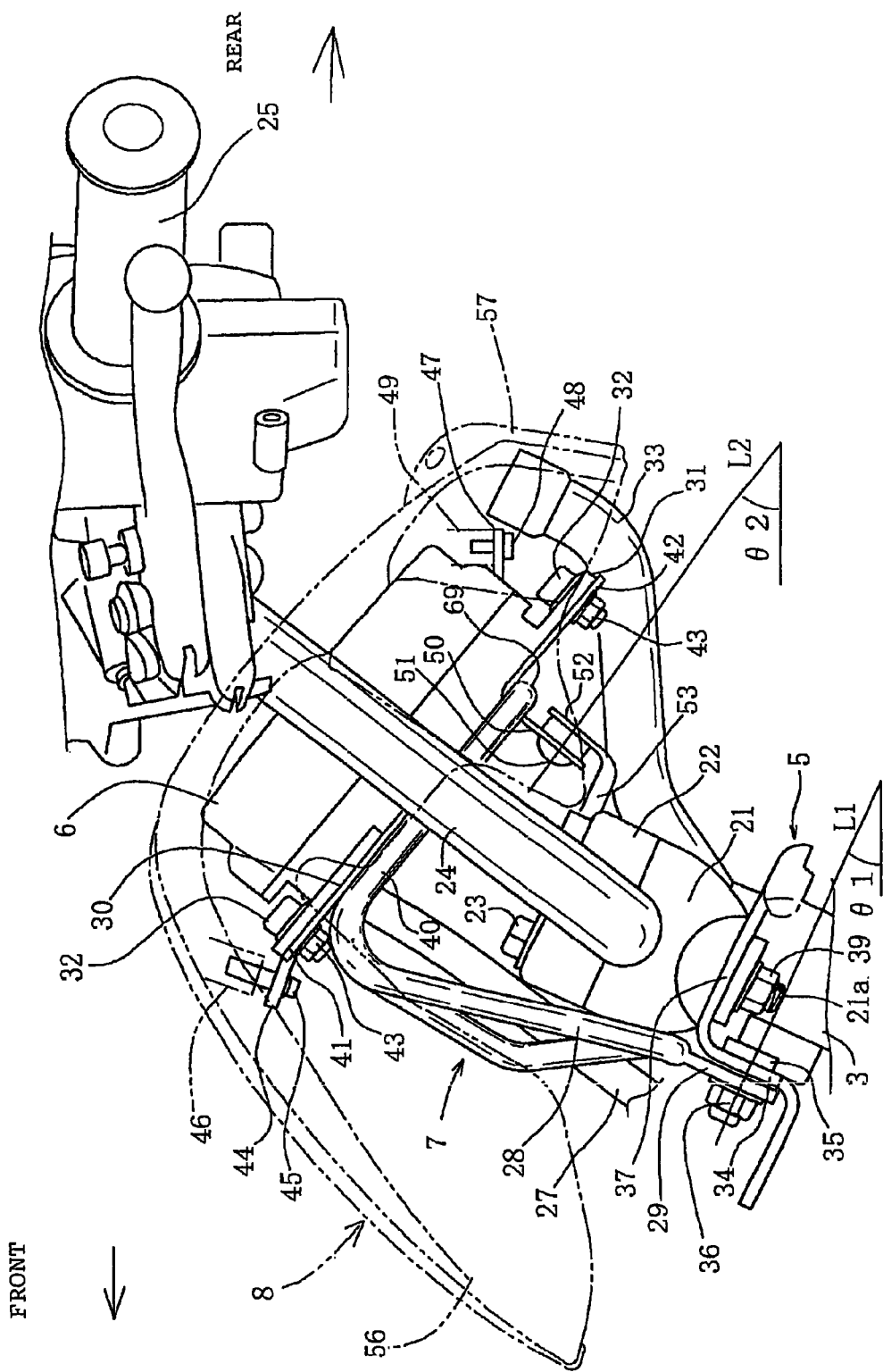
FIG. 4 is an enlarged side elevational view showing the meter support portion.

FIG. 4 is an enlarged side elevational view showing a mounting portion of the meter 6. The top bracket 5 is a sheet-like member having a cross section bent in a crank shape. The top bracket 5 includes a riser 34 disposed forward of the steering shaft 3. The riser 34 is rearwardly inclined (a condition, in which an upper side is inclined toward the rear; the same applies hereunder) to correspond to the steering shaft 3 that is rearwardly inclined. The riser 34 is, however, inclined slightly less than the steering shaft 3.

The mounting portion 29 of the leg portion 28 placed to overlap with a front surface of the riser 34 is secured with a bolt 35 and the nut 36. The bolt 35 is installed from the rear of the riser 34 and fastened with the nut 36 on the front surface of the riser 34. A mounting axis L1 is orthogonal to the riser 34, being inclined obliquely downwardly toward the rear. The leg portion 28 is slightly bent forward at a position upward of the mounting portion 29. The leg portion 28 is then extended upwardly in a rearwardly inclined state with an inclined angle smaller than that of the riser 34.

Referring to FIGS. 2 and 3, a threaded portion (not shown) disposed on an upper end of the steering shaft 3 is passed through an upper step portion 37 of the top bracket 5. A nut 38

(FIG. 2) is then tightened over the threaded portion. The lower brackets 21 are mounted on the left and right end portions of the top bracket 5.

Referring back to FIG. 4, a bolt portion 21a penetrates through the upper step portion 37 and protrudes downwardly from a bottom portion of the lower bracket 21, integrally therewith. A nut 39 is tightened over the protruded portion from a downward direction, so that the lower bracket 21 is fixed onto a lower surface of the upper step portion 37.

The meter stay 7 includes a meter support portion 40 that is bent from an upper portion of the leg portion 28 and integrally extends obliquely downwardly toward the rear. The meter support portion 40 is disposed upward of the top bracket 5, supporting the meter 6 mounted thereon. The meter support portion 40 is inclined at an angle adjusted such that the rearwardly situated rider is easy to view a display portion of the meter 6 supported thereby. In addition, brackets 41, 42 are disposed at front and rear of the meter support portion 40. The protrusions 30, 31 of the meter 6 are placed to overlap the brackets 41, 42. The bolt 32 is then tightened from above into a nut 43 welded to each of the brackets 41, 42.

The meter 6 further includes a mounting protrusion 44 that protrudes obliquely downwardly toward the front from a front side surface of the meter 6. A tapping screw 45 installed in the mounting protrusion 44 from below is tightened to a boss 46 of the meter cover 8. The meter 6 also includes a mounting protrusion 47 that protrudes obliquely upwardly toward the rear from a rear side surface of the meter 6. A tapping screw 48 installed in the mounting protrusion 47 from below is tightened to a boss 49 of the meter cover 8.

A pressure contact portion 50 extends downwardly from a rear end portion of the meter support portion 40. A rubber cushion 51 is integrated with the pressure contact portion 50. There is also provided a receiver flange 52 which extends vertically substantially in parallel with the pressure contact portion 50 with a given spacing rearward therefrom. The rubber cushion 51 is pressed up against the receiver flange 52, so that the meter 6 and the meter stay 7 are given a vibration-proof support for suppressed vibration.

The pressure contact portion 50 and the receiver flange 52 are inclined rearwardly so as to extend substantially in parallel with each other, at an angle greater than a rearwardly inclined angle of the steering shaft 3. A pressure direction axis L2 of the rubber cushion 51 is orthogonal to the pressure contact portion 50 and the receiver flange 52. An inclined angle θ2 of the pressure direction axis L2 relative to a horizontal line is greater than an inclined angle θ1 of the mounting axis L1 relative to the horizontal line. It is to be noted, however, that the leg portions 28 are mounted in the same direction as the rubber cushion 51 are pressed in that both are directed from a forward and obliquely upward direction toward a rearward direction.

The receiver flange 52 is formed by bending upwardly a rear portion of a receiver member 53 disposed upward of the top bracket 5. The receiver member 53 is disposed inclinedly, substantially in parallel with the upper step portion 37 of the top bracket 5. Referring to FIG. 2, the receiver member 53 is secured, at a front end portion thereof, to a mounting portion 54 that extends in an inboard direction from each of the left and right upper brackets 22, 22 with a bolt 55. This arrangement allows the receiver member 53 to be secured at the same time that the upper brackets 22, 22 are installed with the upper brackets 22, 22 integrated together with the receiver member 53. This makes for easy installation. Additionally, the receiver member 53 can be disposed near the pressure contact portion 50, which allows the receiver member 53 to be downsized. It should be noted, however, that the receiver member 53 may be installed to the top bracket 5.

Referring again to FIG. 4, the meter cover 8 spreads out over the meter 6 from above to cover areas surrounding and upward of the meter 6. At the same time, a front portion 56 that covers an area forward of the meter 6 droops along an area forward of the meter stay 7 down to a point near the top bracket 5. Further, a rear portion 57 covers the breather pipe 33 up to an upper end portion thereof so as to cover an area rearward of the meter 6. The upper end portion of the breather pipe 33 is located inside the rear portion 57.

Figure 5:
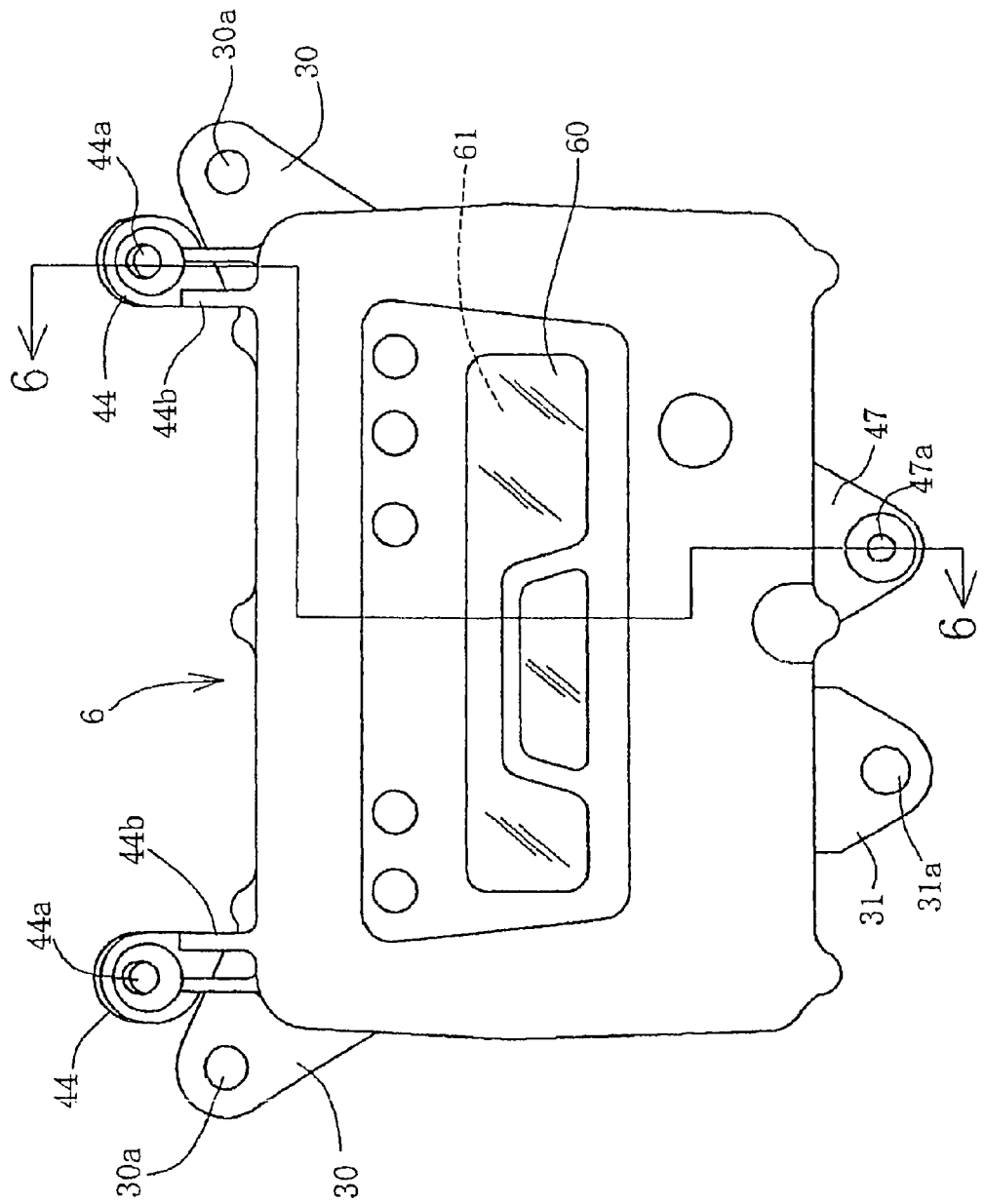
FIG. 5 is a plan view showing a meter.

FIG. 5 is a plan view showing the meter 6. The meter 6 is a GPS meter capable of displaying position information and the like by processing GPS signals received as necessary, in addition to performing functions of general speedometers and odometers. The protrusions 30, 30 protruding obliquely outwardly from left and right corners at the front portion of the meter 6 include bolt through holes 30a, 30a made therein. The bolt 32 (FIG. 4) is installed in each of these bolt through holes 30a, 30a. The left and right mounting protrusions 44, 44 are formed to protrude forwardly from the same corners. Each of the mounting protrusions 44, 44 includes a through hole 44a formed therein, in which the tapping screw 45 (FIG. 4) is screwed. In addition, ribs 44b, 44b are formed for reinforcement between the mounting protrusions 44, 44 and the front portion of the meter 6.

The meter 6 includes a display 60 disposed at a center on an upper surface thereof. A liquid crystal display panel 61 faces an inside of the display 60. The display 60 displays various types of data including speed, revolutions, amount of fuel still available for use, and distance driven. The meter 6 also includes the mounting protrusion 47 disposed at the center in the rear thereof. The mounting protrusion 47 includes a through hole 47a formed therein, through which the tapping screw 48 (FIG. 4) is installed.

The meter 6 further includes the protrusion 31 formed at a position on the left side relative to the center of the meter 6 in the rear, further leftward from the mounting protrusion 47. The protrusion 31 includes a through hole 31a formed therein, through which the bolt 32 (FIG. 4) is installed.

Figure 6:
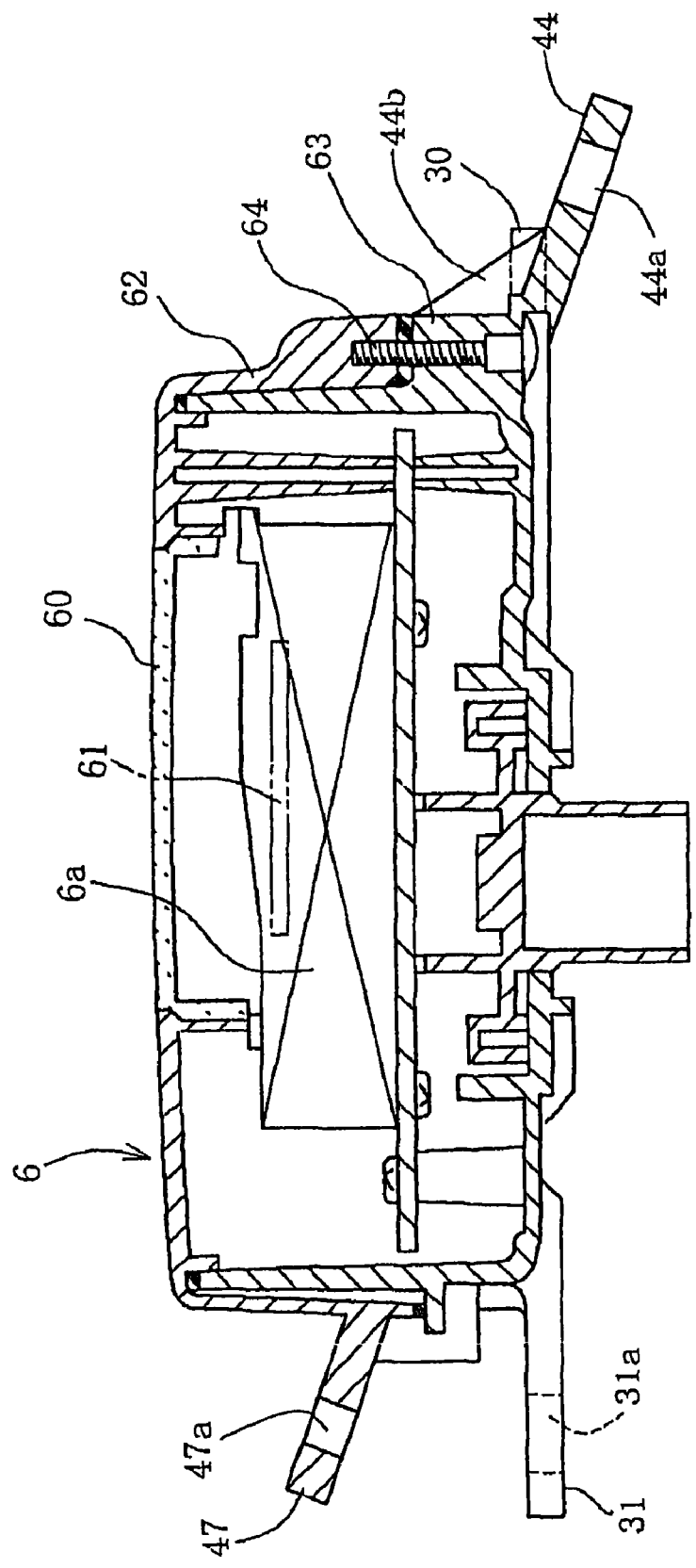
FIG. 6 is a cross-sectional view taken along line 6-6 of FIG. 5.

FIG. 6 is a cross-sectional view taken along line 6-6 of FIG. 5. The meter 6 includes an upper case 62 and a lower case 63 mated together and integrated using a screw 64. The liquid crystal display panel 61 and built-in parts 6a including a GPS processing circuit and a GPS antenna are housed inside the meter 6. The built-in parts 6a, which are well-known, are only schematically shown.

Figure 7:
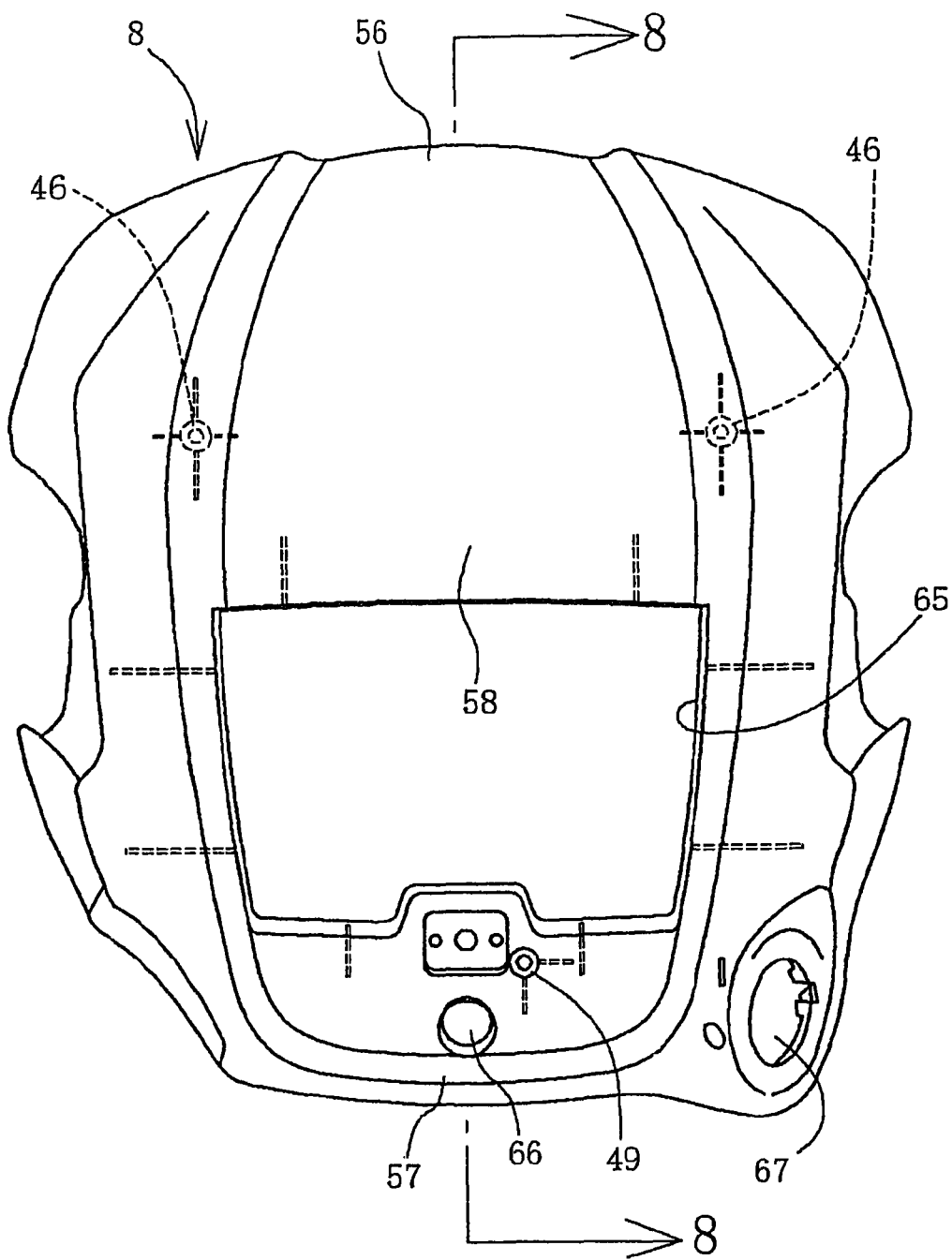
FIG. 7 is a plan view showing a meter cover.

FIG. 7 is a plan view showing the meter cover 8. The meter cover 8 formed from a resin includes a display window 65, through which the display 60 (FIG. 5) of the meter 6 is exposed. The bosses 46 are formed on both sides in the lateral direction of the front portion 56, while the boss 49 is formed in the rear at a position toward and near the center. The meter cover 8 also includes a boss hole 66 formed near the boss 49. In addition, the meter cover 8 includes an opening 67 on the large side in the rear on a right side surface thereof.

Figure 8:
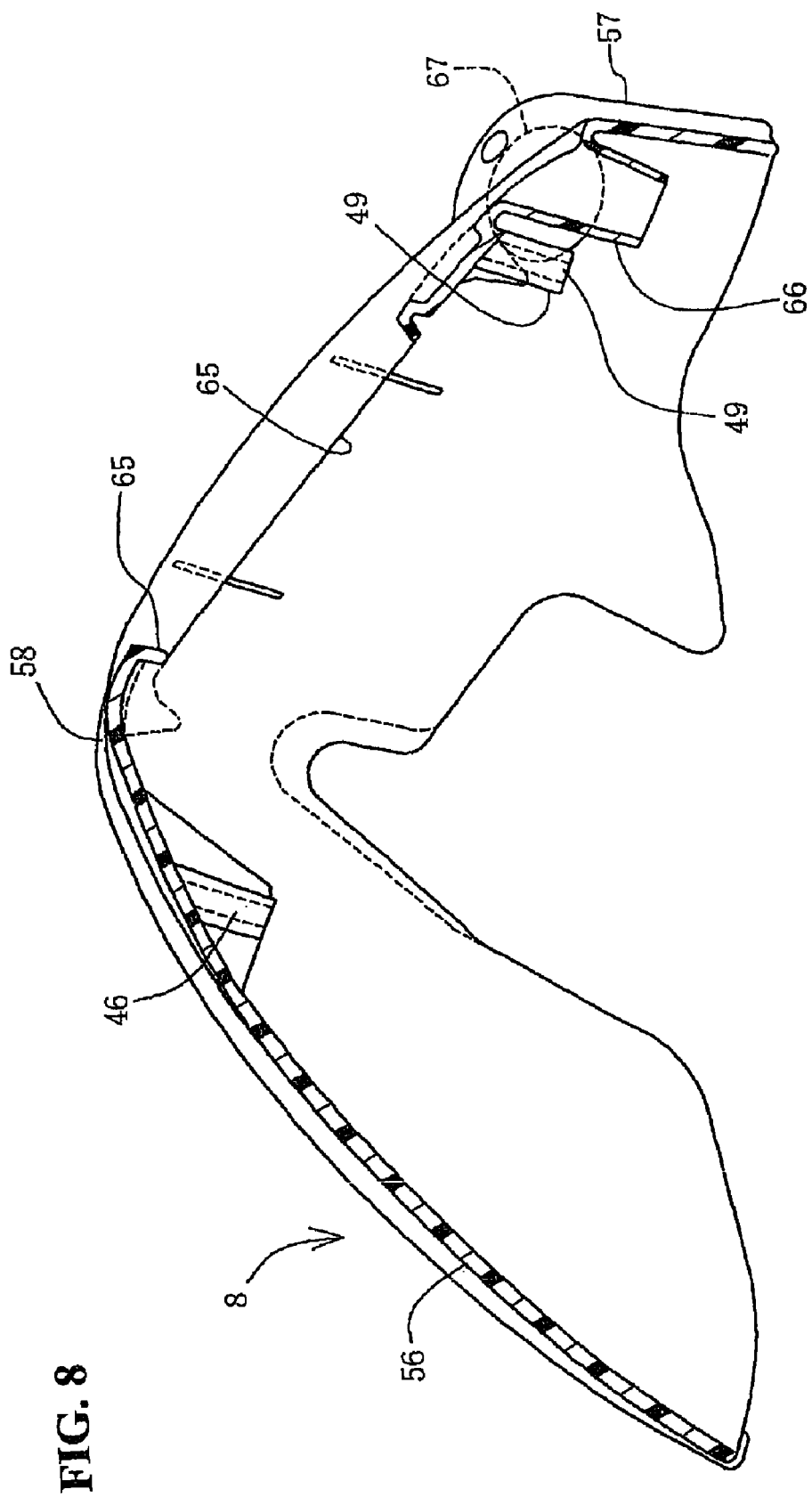
FIG. 8 is a cross-sectional view taken along line 8-8 of FIG. 7.

FIG. 8 is a cross-sectional view taken along line 8-8 of FIG. 7. FIG. 8 shows that the boss 46, the boss 49, and the boss hole 66 are, respectively, formed inside the meter cover 8, integrally protruding downwardly. The boss hole 66 has a lower end opening facing an upper end portion of the breather pipe 33 (see FIG. 4). The meter cover 8 further includes a hole 67 that is open in a side surface thereof in the rear for an ignition key. The meter cover 8 has substantially a mountain-like side elevational shape with a vertex 58 in a longitudinally intermediate portion. The display window 65 is formed on a slope on a rearward side, opening toward the direction of the rider.

Figure 9:
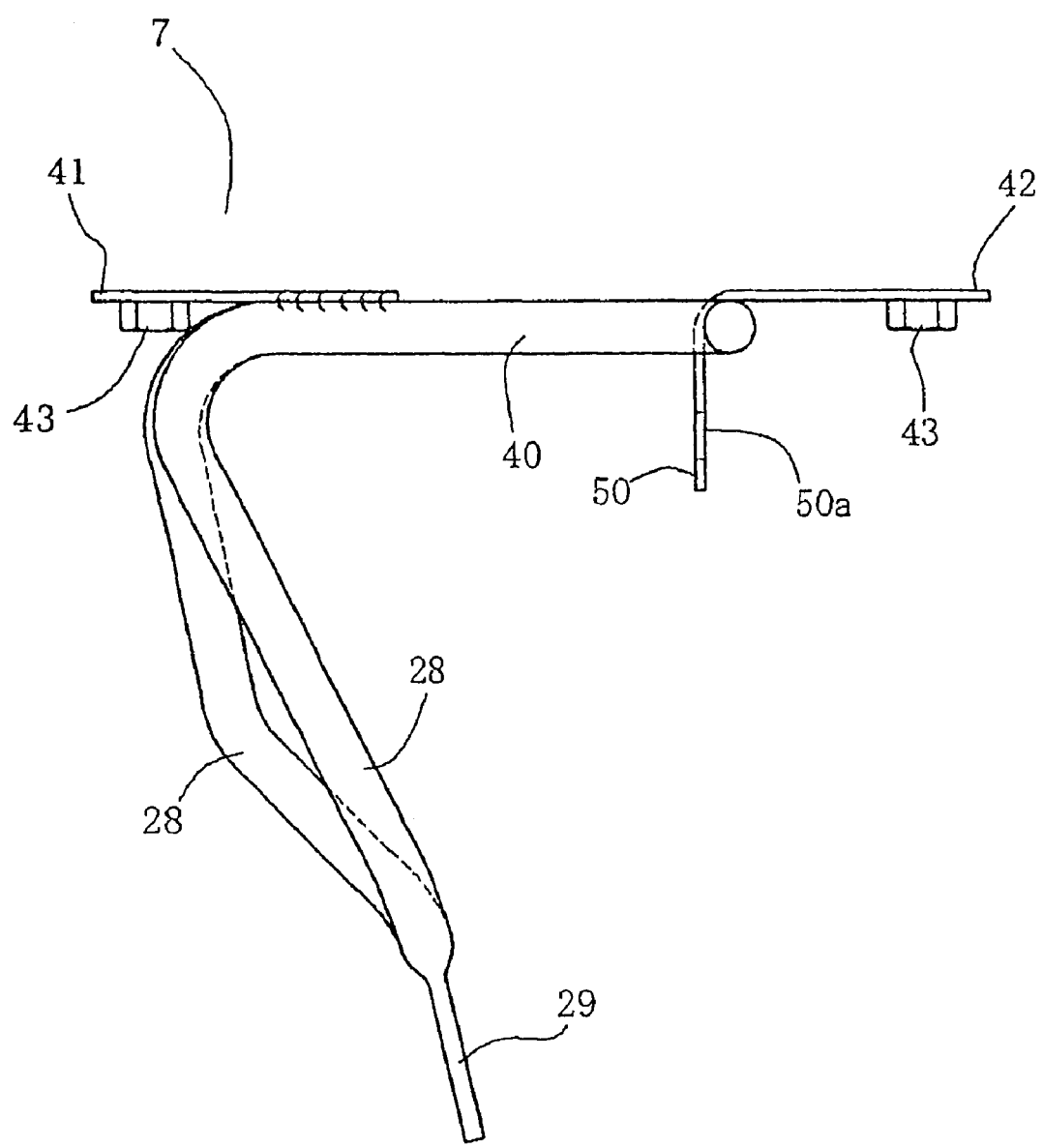
FIG. 9 is a side elevational view showing a meter stay.
Figure 10:
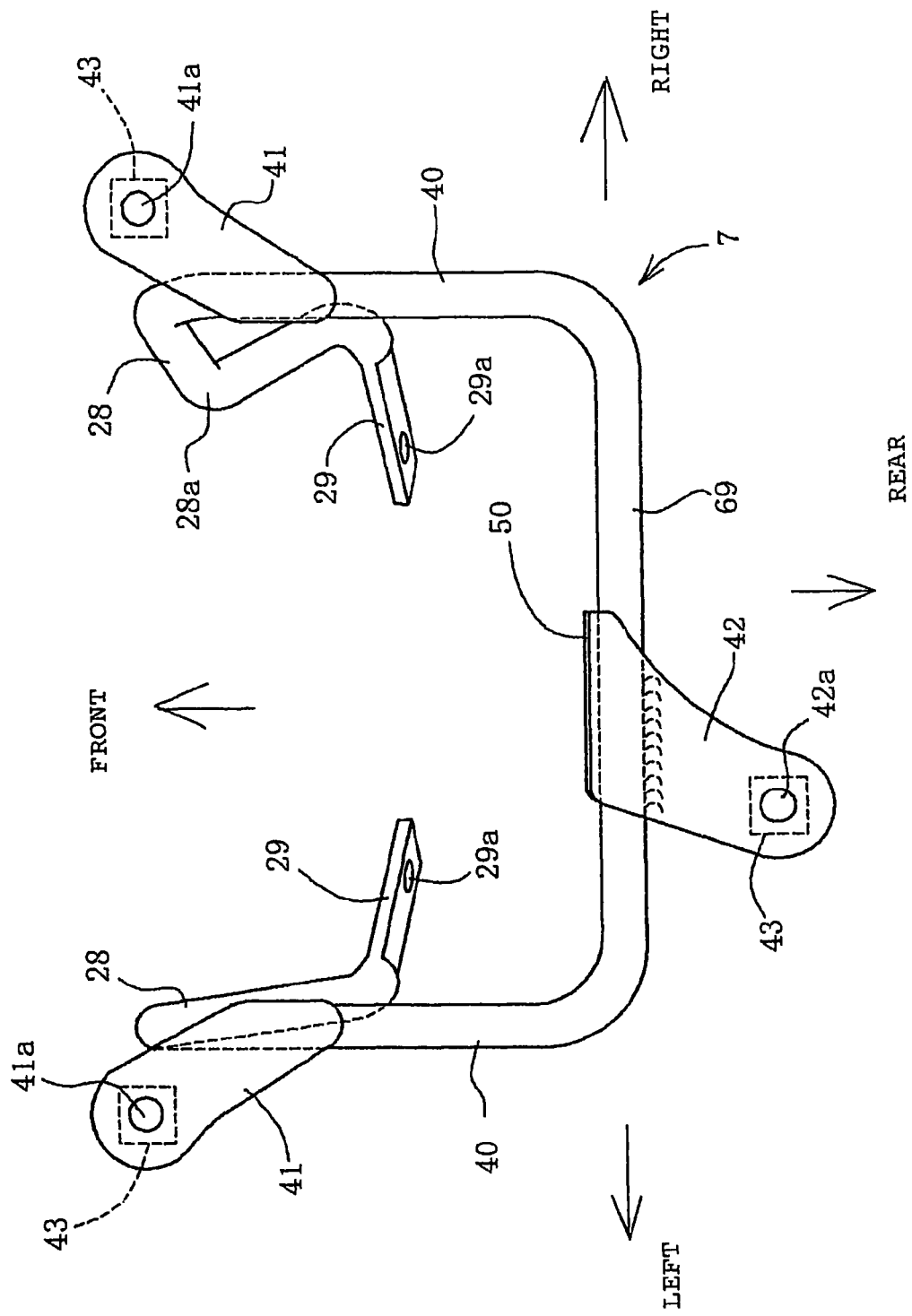
FIG. 10 is a plan view showing the meter stay.
Figure 11:
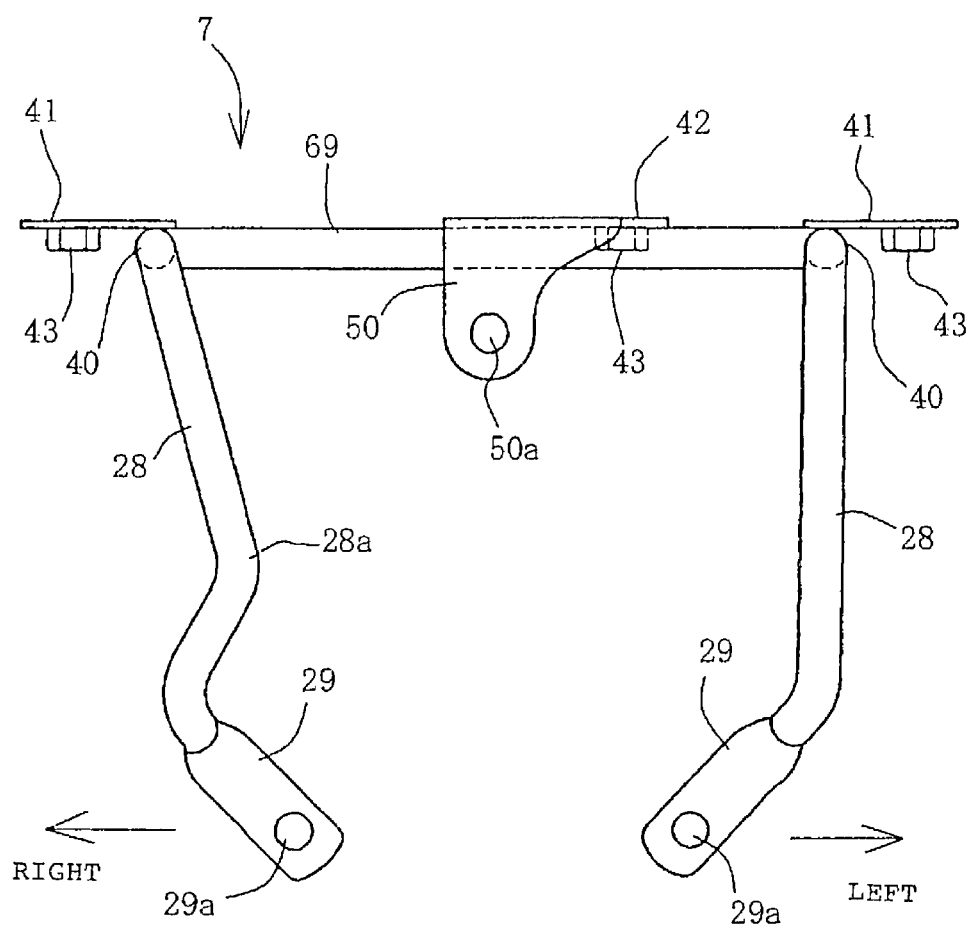
FIG. 11 is a front view showing the meter stay.

FIGS. 9 through 11 are views showing the meter stay 7 in detail. FIG. 9 is a side elevational view. The leg portions 28, 28 have different bent shapes between the left and right. The right (shown in the rear in FIG. 9) leg portion 28 has an intermediate portion bent so as to protrude forwardly, protruding further forwardly than the left (shown at the front in FIG. 9) leg portion 28. Upper and lower portions of the right leg portion 28 overlap the left leg portion 28 in a side view.

The bracket 41 and the bracket 42 are welded to the meter support portion 40, each being welded with the nut 43 on a backside thereof.

The bracket 42 is integrated with the pressure contact portion 50. The bracket 42 has an intermediate portion bent substantially at right angles downwardly, the downwardly bent portion serving as the pressure contact portion 50.

FIG. 10 is a plan view showing the meter stay 7. A pair of the left and right meter support portions 40, 40 is formed continuously with the left and right leg portions 28, 28. Trailing end portions of the left and right meter support portions 40, 40 continue to a cross portion 69 extending laterally. The meter support portions 40, 40 and the cross portion 69 substantially form a C shape in a plan view. The leg portions 28, the meter support portions 40, and the cross portion 69 are integrally formed from a single pipe member which is bent at different positions as necessary. Lower portions of the leg portions 28 are bent and extend rearwardly.

The bracket 42 extends obliquely leftwardly from an intermediate portion of the cross portion 69. The bracket 42 includes a through hole 42a formed in a leading end portion thereof at a position at which the nut 43 overlaps. A proximal side of the bracket 42 is welded on the cross portion 69 and bent at substantially at right angles downwardly at a point farther forward of the cross portion 69, thus forming the pressure contact portion 50. The left and right brackets 41, 41 are also welded to the left and right meter support portions 40, 40 at front portions thereof. The left and right brackets 41, 41 include bolt through holes 41a, 41a made therein, at which the nuts 43 overlap.

FIG. 11 is a front view showing the meter stay 7. The pressure contact portion 50 extends downwardly from an intermediate portion of the cross portion 69. The pressure contact portion 50 includes a through hole 50a formed in a leading end side thereof. The rubber cushion 51 (FIG. 4) is fitted in the through hole 50a. The nut 43 disposed on the underside of each of the left and right brackets 41, 41 is disposed at an outboard position relative to the meter support portion 40.

Of the left and right leg portions 28, the left one extend downwardly substantially straightly. While the right one extends obliquely inwardly and is then bent outwardly at a bent portion 28a on a downward side of an intermediate portion. The right leg portion 28 is then again bent inwardly. The left and right mounting portions 29 extend obliquely mutually inwardly. The bolt 35 (FIG. 4) is passed through a through hole 29a formed in each of the mounting portions 29.

Figure 12:
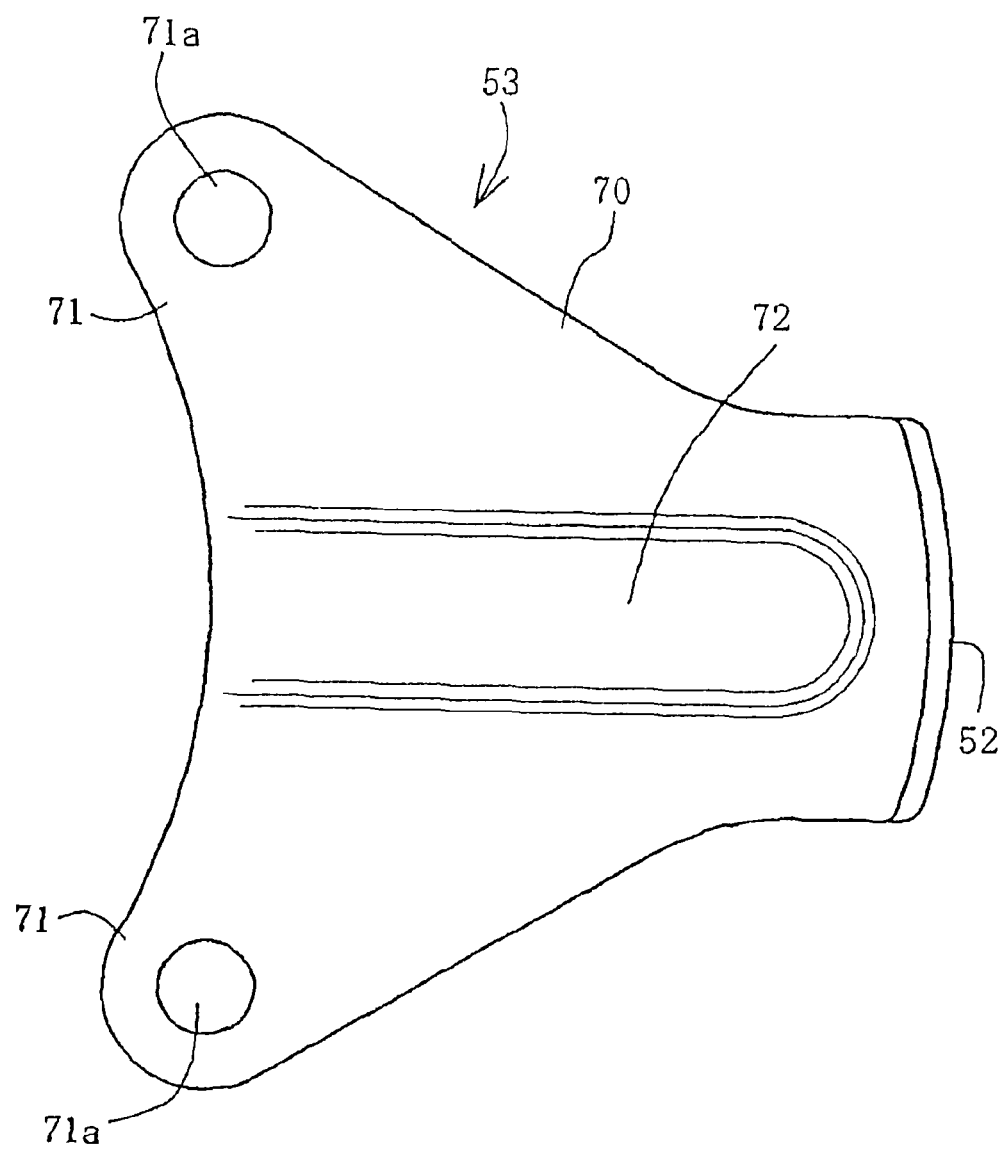
FIG. 12 is a plan view showing a receiver member.

FIG. 12 is a plan view showing the receiver member 53. The receiver member 53 is formed from an appropriate metal plate or the like. A main body portion 70 of the receiver member 53 is shaped substantially into a letter Y with a forward side thereof bifurcating laterally. A forward bifurcation 71, 71 includes through holes 71a, 71a made in the two branches. The bolt 55 is installed in each of the through holes 71a, 71a, to be fastened to a nut portion on the mounting portion 54 (FIG. 2).

The receiver member 53 includes a rib 72 formed at a central portion thereof as a reinforcement.

Figure 13:
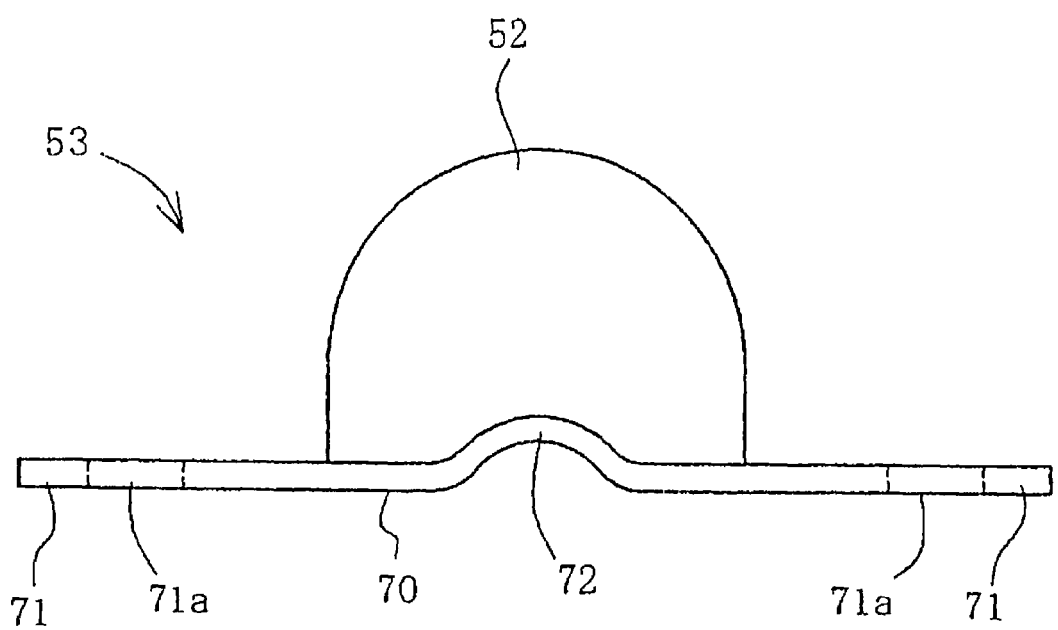
FIG. 13 is a front view showing the receiver member.

FIG. 13 is a front view showing the receiver member 53. The rib 72 is a substantially semicircular protuberance protruding upwardly at a center of the main body portion 70. The receiver flange 52 is formed into a substantially semicircular shape even larger than the rib 72.

Effects of the embodiment of the present invention will be described below. Referring to FIG. 4, the meter 6 is supported by the meter support portion 40 of the meter stay 7 and the meter cover 8 is supported by the meter 6. Then, the meter stay 7 is cantilevered at a fastening point by means of the bolt 35 and the nut 36 for the mounting portion 29 which is a support point for the top bracket 5. The meter support portion 40 away from the fastening point supports the meter 6 and the meter cover 8. Consequently, an end of the meter support portion 40 adjacent to the cross portion 69, which is the farthest from the fastening point, tends to vibrate most largely when vehicle body vibration or the like is received.

In accordance with the embodiment of the present invention, however, the pressure contact portion 50 extending obliquely downwardly and forwardly from the cross portion 69 is pressed against the receiver flange 52 via the rubber cushion 51 from a forward direction, being in a pressed condition. This allows the receiver flange 52 to receive elastically an initial load on the side of the meter support portion 40. As a result, support stiffness in the meter stay 7, which is originally a cantilever type, can be enhanced.

Moreover, if the meter support portion 40 does vibrate, the vibration can be absorbed by the rubber cushion 51, since the pressure contact portion 50 is pressed against the receiver flange 52 via the rubber cushion 51. This suppresses vibration of the meter 6, helping make it easy to view the reading of the meter 6. Further, the meter stay 7 is cantilevered. Accordingly, should a rear portion side of the cross portion 69 or the like be to vibrate largely in the longitudinal direction, the pressure contact portion 50 is pressed against the receiver flange 52 from the forward direction. This effectively provides vibration-proof support for the rear portion side.

As a result, the support stiffness of the meter stay 7 can be enhanced and vibration can be absorbed. Additionally, a need can be eliminated for building a large and heavy meter support structure with the aim of providing enhanced stiffness, achieving a relatively compact and lightweight meter support structure.

Moreover, mounting can also be easy, since it is necessary only to press the rubber cushion 51 against the receiver flange 52 without making a direct coupling between the pressure contact portion 50 and the receiver flange 52.

The pressure contact portion 50 extends downwardly from the meter support portion 40. The receiver member 53 is supported by the upper brackets 22 on the top bracket 5. There is also provided the receiver flange 52 that overlaps longitudinally rearward of the pressure contact portion 50. As a result, the receiver member 53 can be disposed near the pressure contact portion 50, which allows the receiver member 53 to be even more downsized.

The leg portions 28 of the meter stay 7 are attached via the mounting portions 29 to the top bracket 5 from the forward direction. The mounting axis L1 (FIG. 4) of the leg portions 28, 28 is thereby made to extend in the same direction as the pressure direction axis L2 (FIG. 4) of the rubber cushion 51. Attaching the leg portions 28 of the meter stay 7, therefore, results in the rubber cushion 51 being pressed against the receiver flange 52. This facilitates assembly procedures.

The present invention is not intended to be limited to the embodiments specifically mentioned. It will be understood by those skilled in the art that various changes in form and detail may be made therein without departing from the spirit and scope of the invention. For example, the meter stay 7 is not necessarily fixed to the handlebar support member; rather, the meter stay 7 may be fixed to the steering shaft 3 itself or a member integrated with the steering shaft 3. Similarly, the receiver member 53 may be the top bracket 5 itself or the steering shaft 3 itself, or any member integrated therewith. Further, the pressure contact portion 50 is not necessarily a sheet-like member extending downwardly. The pressure contact portion 50 may be a protrusion formed integrally with the cross portion 69. Moreover, the elastic member is not a must and may be omitted, or the material may be changed to one other than rubber.

The pressure direction may be vertical, in which case, the receiver flange 52 may be changed as appropriately depending on the structure of the mating part.

Further, the present invention is applicable to any type of vehicle having a handlebar, such as a motorcycle.

What is claimed is:

1. A meter support structure for a vehicle comprising:
   a handlebar support member disposed on an upper end portion of a steering shaft,
   wherein a handlebar is fixed to the handlebar support member, and a meter is supported by the handlebar support member on a point near the handlebar via a meter support member,
   wherein the meter support member includes a leg portion extending substantially vertically, and a meter support portion bent from an upper portion of the leg portion to extend toward an area upward of the handlebar support member;
   wherein the leg portion has a lower end portion supported on a side of the steering shaft;
   wherein the meter is disposed upward of the handlebar support member by mounting the meter on the meter support portion; and
   wherein an end portion of the meter support portion disposed upward of the handlebar support member is supported by being pressed up against a receiver portion disposed on the side of the steering shaft,
   wherein the end portion disposed upward of the handlebar support member is a pressure contact portion included in the meter support portion, and
   wherein an elastic member disposed on the pressure contact portion is pressed against the receiver portion.

2. The meter support structure according to claim 1, wherein the receiver portion is secured to brackets which hold the handlebar.

3. The meter support structure according to claim 1, wherein the pressure contact portion extends downwardly from the meter support portion,
   wherein the receiver portion is supported by the handlebar support member and includes a receiver flange overlapping longitudinally rearward of the pressure contact portion, and
   wherein the elastic member is pressed up against the receiver flange from a forward direction.

4. The meter support structure according to claim 3, wherein the leg portion of the meter support member is attached to the handlebar support member from the forward direction, and
   wherein a direction in which the leg portion is attached coincides with a direction in which the elastic member is pressed.

5. The meter support structure according to claim 1, wherein the meter is made to support a handlebar cover.

6. The meter support structure according to claim 1, wherein the handlebar support member is a top bracket formed as a sheet that includes a cross section bent in a crank shape.

7. The meter support structure according to claim 1, wherein the handlebar support portion includes a riser disposed forward of the steering shaft, the riser being rearwardly inclined at an angle that is slightly less than a rearwardly inclined angle of the steering shaft.

8. The meter support structure according to claim 7, wherein the lower end portion of the leg portion overlaps a front surface of the riser and is secured with a bolt.

9. The meter support structure according to claim 7, wherein a mounting axis of the lower end portion is orthogonal to the riser, and is inclined obliquely downwardly toward the rear, and
   wherein the leg portion is slightly bent forward at a position upward of the lower end portion so that the leg portion extends upwardly in a rearwardly inclined state with an inclined angle smaller than that of the riser.

10. The meter support structure according to claim 1, wherein the leg portion includes a right leg portion and a left leg portion having different bent shapes.

11. A meter support structure for supporting a meter on a vehicle having a steering shaft and a handlebar, the meter support structure comprising:
    a handlebar support member disposed on an upper end portion of the steering shaft,
    wherein the handlebar is fixed to the handlebar support member, and the meter is supported by the handlebar support member on a point near the handlebar via a meter stay formed of a pipe member,
    wherein the meter stay includes a leg portion extending substantially vertically, and a meter support portion bent rearwardly from an upper portion of the leg portion and extend above the handlebar support member and a central portion of the handlebar;
    wherein the leg portion has a lower end portion supported on a side of the steering shaft;
    wherein the meter is disposed above of the handlebar support member by mounting the meter on the meter support portion; and
    wherein an end portion of the meter support portion disposed above of the handlebar support member is supported by being pressed up against a receiver portion disposed on the side of the steering shaft,
    wherein the end portion disposed upward of the handlebar support member is a pressure contact portion included in the meter support portion, and
    wherein an elastic member disposed on the pressure contact portion is pressed against the receiver portion.

12. The meter support structure according to claim 11, wherein the receiver portion is secured to the handlebar support member.

13. The meter support structure according to claim 11, wherein the pressure contact portion extends downwardly from the meter support portion,
    wherein the receiver portion is supported by the handlebar support member and includes a receiver flange overlapping longitudinally rearward of the pressure contact portion, and
    wherein the elastic member is pressed up against the receiver flange from a forward direction.

14. The meter support structure according to claim 13, wherein the leg portion of the meter stay is attached to the handlebar support member from the forward direction, and wherein a direction in which the leg portion is attached coincides with a direction in which the elastic member is pressed.

15. The meter support structure according to claim 11, wherein the meter is made to support a handlebar cover.

16. The meter support structure according to claim 11, wherein the handlebar support member is a top bracket formed as a sheet that includes a cross section bent in a crank shape.

17. The meter support structure according to claim 11, wherein the handlebar support portion includes a riser disposed forward of the steering shaft, the riser being rearwardly inclined at an angle that is slightly less than a rearwardly inclined angle of the steering shaft.

18. The meter support structure according to claim 17, wherein the lower end portion of the leg portion overlaps a front surface of the riser and is secured with a bolt.

19. The meter support structure according to claim 17, wherein a mounting axis of the lower end portion is orthogonal to the riser, and is inclined obliquely downwardly toward the rear, and wherein the leg portion is slightly bent forward at a position upward of the lower end portion so that the leg portion extends upwardly in a rearwardly inclined state with an inclined angle smaller than that of the riser.

20. The meter support structure according to claim 11, wherein the leg portion includes a right leg portion and a left leg portion having different bent shapes.

* * * * *